Nov. 15, 1960   E. E. ALLEN   2,959,943
COUPLING FOR DRIVING A MACHINE
Filed Sept. 11, 1958
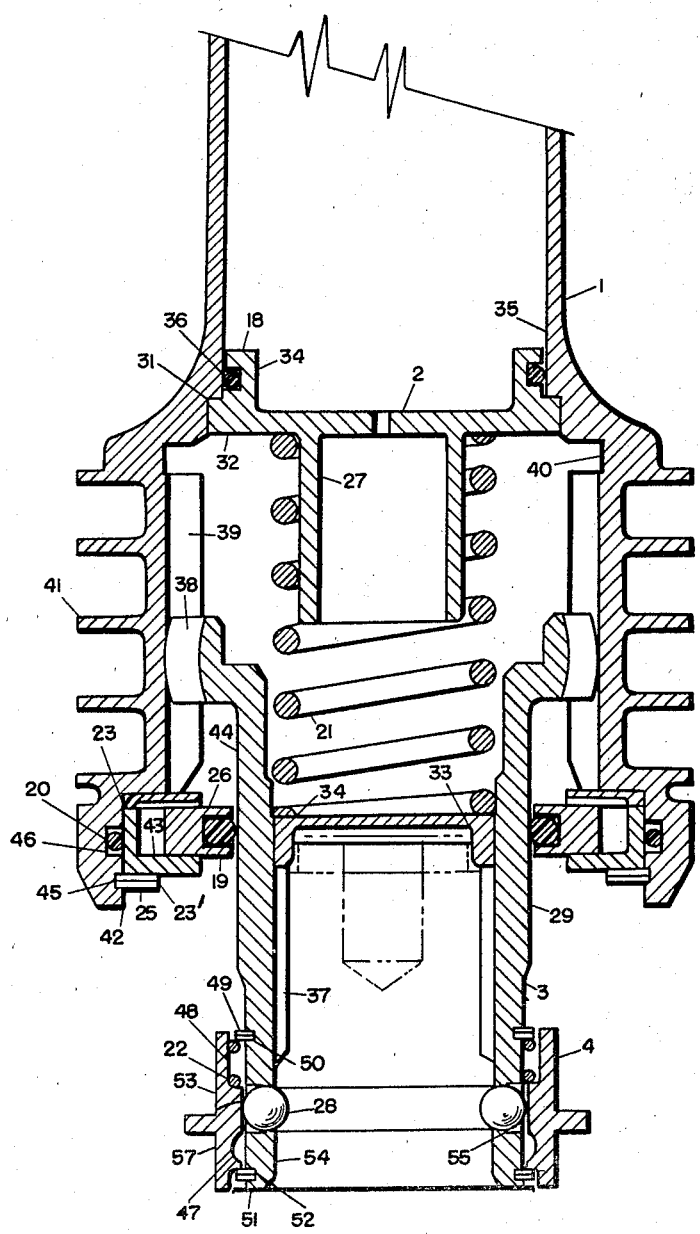
INVENTOR.
EDWARD E. ALLEN
BY
Charles L. Lovercheck
attorney United States Patent Office 2,959,943
Patented Nov. 15, 1960

2,959,943

COUPLING FOR DRIVING A MACHINE

Edward E. Allen, Erie, Pa., assignor to Zurn Industries, Inc., Erie, Pa., a corporation of Pennsylvania Filed Sept. 11, 1958, Ser. No. 760,495

1 Claim. (Cl. 64—9)

This invention relates to couplings and, more particularly, to gear type couplings for connecting a driving machine to a driven machine where misalignment capacity is necessary between the driving member and the driven member.

In the present invention, a self-contained coupling is disclosed having a quick disconnect and assembly feature which does not require the use of tools and which eliminates the necessity of disturbing other equipment which may be attached thereto. The shaft is self-locking and it is provided with fins to increase the cooling efficiency of the coupling. Breather holes are provided to compensate for pressure differential inside and outside the coupling and the device is spring loaded in order to center the floating sleeve. The seal utilized in the coupling is capable of a high degree of misalignment between the parts of the coupling and the coupling is capable of free axial movement to compensate for shaft growth. A fully crowned gear is provided and, as a result, a coupling of constant angular velocity results.

More specifically, it is an object of this invention to provide a coupling which is simple in construction, economical to manufacture, and simple and efficient in operation.

Another object of the invention is to provide an improved gear type coupling.

A further object of the invention is to provide an improved quick disconnect feature in a gear type coupling.

A still further object of the invention is to provide a self-locking type of shaft having a high misalignment capacity and freedom of axial movement.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a longitudinal cross sectional view of a coupling according to the invention.

Now with more particular reference to the drawing, the drive coupling shown by way of example is suitable for connecting two shafts, one at each end, and the ends of the coupling shown are identical.

The coupling is made up principally of a sleeve 1 which, in this case, is hollow and has the ends inside its counterbore closed by the end of a spring guide 2. A hub 3 having external crowned teeth thereon is supported in each end of the sleeve 1 and the hub 3 is connected to its shaft by means of balls 28 which are urged into a peripheral groove in the surface of the shaft by means of the cam surface on the inner periphery of a sleeve 4.

The sleeve 1 is counterbored at 31 to receive the spring guide 2. The spring guide 2 has a circular disk shaped flange 32 attached to a hollow cylindrical spring guide member 27. The hollow spring guide member 27 is cylindrical on its outside surface to support a spring 21 and the spring 21 rests against an internal collar 33 which is slidably received in an inner bore 34' of the hub 3. The flange 32 has an integrally connected, axially extending portion 34 which has a groove 18 in the outer periphery thereof which receives an O-ring 36. The O-ring 36 forms sealing engagement with an inner periphery 35 of the sleeve 1 and the outwardly projecting portion of the flange 32 rests in the counterbore 31. The hub 3 has an outside peripheral surface 29 and outwardly extending external teeth 38.

The hub 3 also has internal splines 37 which fit into peripheral axially disposed grooves in a shaft to be received therein. The outwardly extending teeth 38 are crowned; that is, they have their flanks and tips formed as sections of spheres to allow the shaft received in the hub 3 to run in a misaligned relation to the sleeve 1. The teeth 38 engage internal teeth 39 in the end of the sleeve 1 and a groove 40 is formed at the inner end of the internal teeth 39 which forms a relief for machining purposes. The outside surface of the sleeve 1 overlying the teeth 39 has fins 41 thereon which aid in dissipating heat from the coupling.

The ends of the sleeve 1 are counterbored at 42 to receive a seal retainer 25. The seal retainer 25 is in the form of a ring having an inner groove 43 therein. A sealing washer 26 is slidably received in the groove 43 so that when the sealing ring which, in this case, is an O-ring 19, is disposed in sealing relation with a peripheral surface 44 of the hub 3, a seal against the escape of lubricant is formed therebetween. The washer 26 is fit accurately into the seal retainer 25 so that lubricant cannot escape therearound. The seal retainer 25 is retained in the counterbore 42 by means of snap rings 23'. The snap rings 23' hold the seal retainer 25 in place in the counterbore 42. The snap rings 23' are made of resilient material and snap into grooves 45 formed on the inner periphery of the counterbore 42. A groove 46 is also formed in the counterbore 42 and it receives an O-ring 20 and forms a seal between it and the seal retainer 25. The counterbore 42 has an inner peripheral surface 23 which receives the seal retainer 25. The ends of the hub teeth 38 will engage the inside surface of the sealing washer 26 to limit the sliding movement of the hub 3 relative to the sleeve 1.

The connection for holding the shaft in the hub 3 is formed by a retainer sleeve 57 which slides telescopically on the hub 3. The retainer sleeve 57 is in the form of a hollow sleeve which is disposed around the outer periphery of the hub 3 and has an internal groove 47 which receives the outer portion of the ball 28 when the retainer sleeve 57 is pushed toward the sleeve 1. The retainer sleeve 57 has a counterbore 48 which receives the spring 22. The spring 22 rests against snap rings 49 which are received in a peripheral groove 50 in the outer periphery of the sleeve. Snap rings 51 are received in a peripheral groove 52 in the sleeve. The snap rings 51 limit the movement of the retainer sleeve 57 so that it is urged to the position with a camming surface 53 overlying the balls 28.

To couple the hub 3 to a shaft, the shaft is inserted in a bore 54 in the hub 3 and the operator pulls the retainer sleeve 57 toward the sleeve 1 so that the balls 28 which are disposed in spaced peripheral holes 55 in the hub 3 will move into the groove 47 and the inside of the balls 28 will, therefore, be flush with the inner periphery of the bore 54 and will allow the shaft to slide between the splines 37 with the splines 37 received in corresponding complementary shaped grooves in the end of the shaft. The internal collar 33 will be urged into engagement with the end of the shaft by means of the spring 21. When the shaft to be connected is in place in the hub 3, the operator will release the retainer sleeve 57 and the spring 22 will force the retainer sleeve 57 back over the balls 28 and the balls 28 will be forced into a peripheral groove in the surface of the shaft and the shaft will thereby be held in place in the hub 3.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A coupling for shafts for connecting a driving machine to a driven machine comprising a coupling sleeve having an internal gear on one end, a hub having external gear teeth thereon extending into said sleeve, means to attach a shaft having a peripheral groove to said hub, said means comprising a hollow end on said hub, circumferentially aligned, spaced apertures in said hub, balls disposed in said apertures, the diameter of said balls being greater than the thickness of the walls of said hub, a retainer sleeve disposed on said hub, said retainer sleeve having an internal peripheral groove therein, a counterbore in said retainer sleeve on the opposite end thereof from said internal peripheral groove, a helical compression spring on said hub having one end disposed in said counterbore against said retainer sleeve, a snap ring on said hub spaced from said apertures and engaging an end of said spring spaced from said end engaging said retainer sleeve, said retainer sleeve movable to compress said spring and bring said internal peripheral groove over said balls allowing said balls to move into said internal peripheral groove, said retainer sleeve being urged by said spring to move said internal peripheral groove off of said balls and to force said balls into said groove in said shaft, and a spline in said hub interfitting with an axially disposed groove in said shaft.

References Cited in the file of this patent

UNITED STATES PATENTS

| | | |
|---|---|---|
| 1,642,490 | Decker | Sept. 13, 1927 |
| 2,667,048 | Whitfield | Jan. 26, 1954 |
| 2,807,473 | Kiehne | Sept. 24, 1957 |
| 2,842,945 | Swanson | July 15, 1958 |
| 2,845,781 | O'Brien | Aug. 5, 1958 |

FOREIGN PATENTS

| | | |
|---|---|---|
| 611,129 | Germany | Mar. 22, 1935 |
| 877,754 | France | Sept. 14, 1942 |